(12) United States Patent
Jones et al.

(10) Patent No.: US 9,826,080 B2
(45) Date of Patent: Nov. 21, 2017

(54) SHARING A SINGLE EXTERNAL ACCESSORY CONNECTION OF A MOBILE DEVICE ACROSS MULTIPLE APPLICATION PROGRAMS

(71) Applicant: AIRBIQUITY INC., Seattle, WA (US)

(72) Inventors: Logan B. Jones, Seattle, WA (US); Daniel Stephen Jaramillo, Seattle, WA (US)

(73) Assignee: Airbiquity Inc., Seattle, WA (US)

( * ) Notice: Subject to any disclaimer, the term of this patent is extended or adjusted under 35 U.S.C. 154(b) by 0 days.

(21) Appl. No.: 15/357,430

(22) Filed: Nov. 21, 2016

(65) Prior Publication Data

US 2017/0195471 A1    Jul. 6, 2017

Related U.S. Application Data

(60) Provisional application No. 62/275,186, filed on Jan. 5, 2016.

(51) Int. Cl.
*H04M 1/725* (2006.01)
*H04W 4/00* (2009.01)
(Continued)

(52) U.S. Cl.
CPC .......... *H04M 1/7253* (2013.01); *H04L 67/42* (2013.01); *H04W 4/001* (2013.01); *H04W 76/023* (2013.01); *H04W 76/045* (2013.01)

(58) Field of Classification Search
CPC ............... H04L 2463/082; H04L 63/10; H04L 65/1059; H04L 63/062; H04L 67/22; H04L 9/14; H04L 9/302; H04W 12/06; H04W 36/0033; H04W 36/0066; H04W 4/22; H04W 76/023; H04W 68/005;
(Continued)

(56) References Cited

U.S. PATENT DOCUMENTS

2013/0086518 A1    4/2013    Park et al.
2014/0277843 A1    9/2014    Langlois et al.
(Continued)

OTHER PUBLICATIONS

EPO, International Search Report and Written Opinion of the International Searching Authority for International Application No. PCT/US2016/063072, dated Jan. 24, 2017, pp. 18.
(Continued)

*Primary Examiner* — Nizar Sivji
(74) *Attorney, Agent, or Firm* — Schwabe, Williamson & Wyatt P.C.

(57) ABSTRACT

In an example, this disclosure provides a mechanism, preferably implementable in software, for a single 'server' application in a mobile device such as a smartphone to act as an intermediary to enable one or more third-party apps on the mobile device to connect and interact with an external accessory, for example, a vehicle component such as an automotive head-unit. The server app manages communications details so that third-party apps need to perform only simple messaging, thus relieving the burden on application providers and reducing the frequency of application updates. Further, the server application maintains a single connection or session with the external accessory (EA), while accommodating switching among multiple different client applications on the phone that seek to interact with the EA.

15 Claims, 6 Drawing Sheets

(51) Int. Cl.
*H04W 76/02* (2009.01)
*H04W 76/04* (2009.01)
*H04L 29/06* (2006.01)

(58) Field of Classification Search
CPC .. H04W 4/206; G06F 3/0482; G06F 3/04842; H04M 3/493; G06Q 50/265; G06Q 10/00; G06Q 10/10; G06Q 20/223; G06Q 20/32; G06Q 50/01; G06Q 50/10; H04N 7/15
See application file for complete search history.

(56) References Cited

U.S. PATENT DOCUMENTS

| | | | |
|---|---|---|---|
| 2015/0032800 A1 | 1/2015 | Hrabak | |
| 2016/0057564 A1* | 2/2016 | Sim | H04W 4/008 455/41.2 |
| 2016/0360027 A1* | 12/2016 | Nelson | H04M 1/72563 |
| 2016/0379592 A1* | 12/2016 | Garrett | G06F 17/214 345/472 |

OTHER PUBLICATIONS

Deville, Damien; "Interprocess Communication on iOS with Berkeley sockets"; Feb. 8, 2015; found online: http://ddeville.me/2015/02/interprocess-communication-on-ios-with-berkeley-sockets/.

Apple Inc.; "About External Accessories"; retrieved Oct. 11, 2016, online: https/developer.apple.com/library/content/featuredarticles/ExternalAccessoryPT/Introductions/Introduction.html#//apple_ref/doc/iud/TP40009502; Copyright 2012, updated Feb. 24, 2012; 2 pages.

Apple Inc.; "External Accessory—Apple Developer Documentation, API Reference"; retrieved Oct. 11, 2016 online: https://developer.apple_com/reference/externalaccessory; Copyright 2016; 2 pages.

* cited by examiner

SHARING A SINGLE EXTERNAL ACCESSORY CONNECTION OF A MOBILE DEVICE ACROSS MULTIPLE APPLICATION PROGRAMS

RELATED APPLICATIONS

This application is a non-provisional of and claims priority to U.S. Provisional Application No. 62/275,186 filed on Jan. 5, 2016 which is incorporated by reference herein in its entirety.

COPYRIGHT NOTICE

© 2016 Airbiquity Inc. A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

BACKGROUND OF THE INVENTION

Various mobile devices, such as "smartphones," watches, wearable devices, etc. are capable of running various application programs or "apps," the Apple iPhone® series of devices being a common example. Other smartphones are currently made by Google, Microsoft, Samsung, LG and others. We refer to all such mobile devices, now known or later developed, as a "phone" in this document for simplicity. In many cases, apps are developed by third-party developers, meaning an entity or person that is not the manufacturer of the phone. A wide variety of apps are available for download to a phone, for example, from an app store. Application development for communication with an external accessory or device coupled to a phone ("EA"), has constraints which can make developing the software for communicating with the EA relatively costly and complex, due in some cases to limitations of inter-process communication protocols between the phone applications and how EA sessions are created and managed.

BRIEF SUMMARY OF THE INVENTION

The following is a summary of the invention in order to provide a basic understanding of some aspects of the invention. This summary is not intended to identify key/critical elements of the invention or to delineate the scope of the invention. Its sole purpose is to present some concepts of the invention in a simplified form as a prelude to the more detailed description that is presented later.

In an example, a novel inter-application communication mechanism distributes messages to and from an EA and one or more client mobile applications in a phone. The communication mechanism may be realized as a server-like communication node, which we call a "server app" although the moniker is not critical. In some embodiments, the "server app" comprises a software component that may be downloaded and installed in a phone much like known applications. It functions, generally, as a conduit between the EA and other apps on the phone, which we refer to as client apps. In some embodiments, the server app manages a single connection to the EA while accommodating switching among various application clients on the phone that seek to communicate with the EA. In other words, the internal "clients" are client apps. This approach relieves the client apps from having to include code for interfacing with the EA, as that role is accomplished by the server app.

In some embodiments, the EA may comprise a software component in a vehicle. The software component may be part of an automotive head-unit ("HU"). In use, requests & responses to and from the head-unit are communicated by the server app to and from other applications on the phone.

In an example, maintaining a connection or session with the HU happens once, in the server app, notwithstanding dynamic changes in which applications on the phone are interacting with the HU (or other EA). Maintaining this EA connection typically is complicated and requires a significant amount of logic code. By utilizing features of the present disclosure, third-party apps (TPA) no longer have to bundle the complicated HU maintenance code with their application. A single HU connection is 'shared' among the interested TPA. Each TPA needs only to bundle a small bit of messaging code to interface with the server app. Furthermore, this messaging code needs very little maintenance; thus providing for much less update churn for TPA developers.

In one embodiment, a mobile device includes: a server application component to couple the mobile device to a motor vehicle via a wired connection or a short range wireless connection; a plurality of client application components, each including a client interface for communications with the server application component; wherein the server application component includes a server interface for communications with the client application components and is configured to manage a session with a remote component of the motor vehicle, to receive encapsulated payloads from the plurality of client application components, and to process the encapsulated payloads for transmission and to process bidirectional control messaging between an active one at a time of the plurality of client application components and the remote component of the motor vehicle over a connection of said session.

Additional aspects and advantages of this invention will be apparent from the following detailed description of preferred embodiments, which proceeds with reference to the accompanying drawings.

DETAILED DESCRIPTION OF PREFERRED EMBODIMENTS

Figure 1:
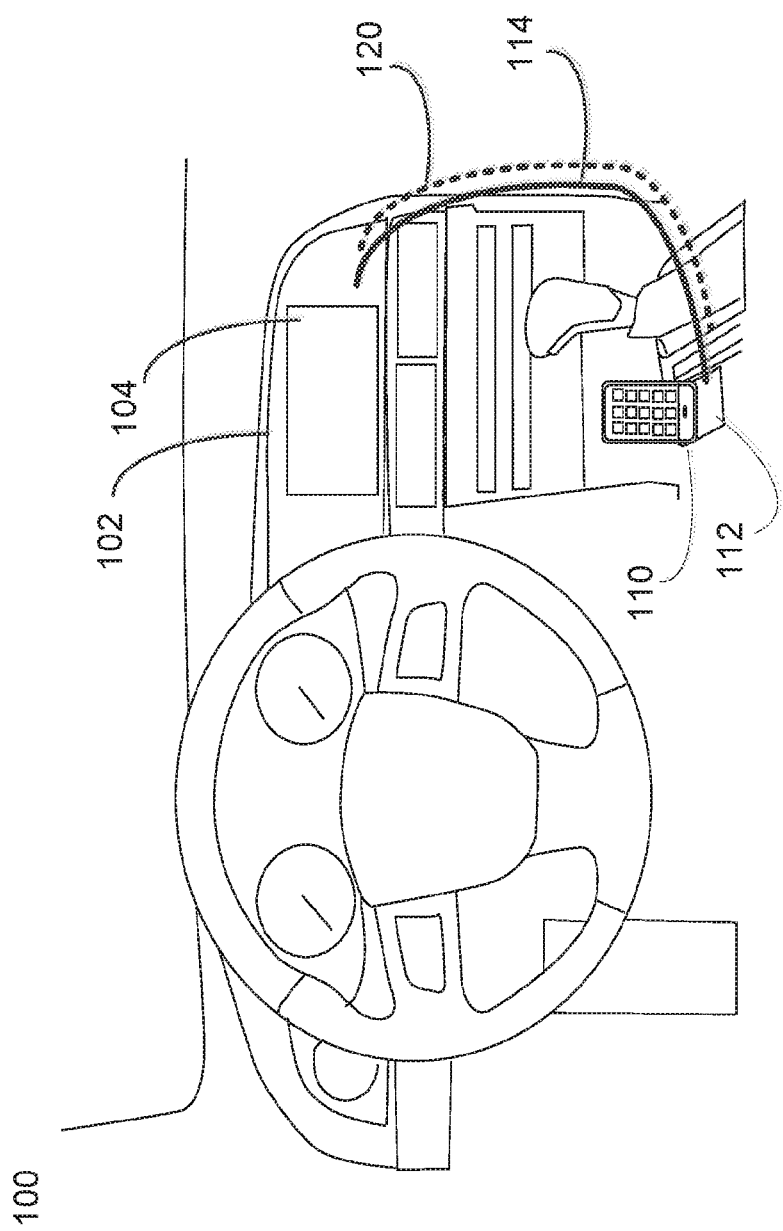
FIG. 1 is a simplified overview of an environment in which the invention may be used.

We will use the Apple iOS® and iPhone® application development environment in this discussion by way of example and not limitation. The present disclosure can be applied to other operating systems and devices. In the iPhone example, application development for communication with an external accessory or device, such as a vehicle, has constraints which make developing the software for communicating with the vehicle costly and complex due to the limitation of inter-process communication between iOS applications and how EA sessions with the vehicle are created and managed.

The communication with the iOS phone and a vehicle requires either a single monolithic application, which contains all third-party application logic and maintains an EA session with the vehicle, or each third-party application on the phone must contain the software to connect individually to the vehicle. Most vehicles are designed to allow for only one connection at a time or have added complexity to allow for and manage multiple EA sessions, which adds to the software development costs and length of time needed to develop the product(s).

If the single monolithic application approach is used, most iOS third-party application providers do not want their product to be part of another application which contains possible competitor software and does not allow for their individual branding and uniqueness of their product, which is detrimental to their competitive advantage in their related market. Also a single application approach does not allow for scalability, in that if a new application needs to be added the single application must be developed to and resubmitted to the iOS app store before it can be used by consumers. This means the third-party application cannot update their app when they want to due to resource available and schedule of the single EA session monolithic application.

For the second approach, where each third-party iOS application containing the EA session connectivity with the vehicle, the applications will need to either switch and share a single EA session with the vehicle if the vehicle can only support a single EA session, or have the added complexity placed upon the vehicle to manage multiple EA sessions simultaneously, which mentioned previously increase the development costs and effort. The need remains for improvements in this technology to reduce cost, improve performance, and improve interoperability among diverse devices and applications.

Embodiments of the present disclosure can be used with many phone applications ("apps"). Some examples of such apps include but are in no way limited to the following: (1) Automotive apps—may be used to configure the HU, provide automotive information, etc. Examples include Nissan-Connect, Uconnect, etc. (2) Audio Apps—present a custom HU user interface. The number of audio apps is growing and includes, for example, Pandora, Spotify, iHeartRadio, and one might expect a new offering from Amazon soon. (3) Mapping Apps—present mapping and route information on the HU: Yelp and Google Maps are representative. (4) Info Apps—in some cases present glanceable information on the HU: Glanceable interfaces may be available from Twitter, Facebook, Eurosport and the like. (5) General use applications such as web browsers can benefit of interfacing with an HU as well.

FIG. 1 is a simplified overview of a motor vehicle environment 100 in which the invention may be used. The figure shows a mobile device 110 which may be secured in a cradle or recess 112. The vehicle has a HU 102 coupled to a display screen 104. Often, the head unit is also coupled to audio components (not shown) which may include microphone and speakers. The mobile device may be connected to the HU via a cable 114 or a wireless connection indicated by dashed line 120.

Figure 2:
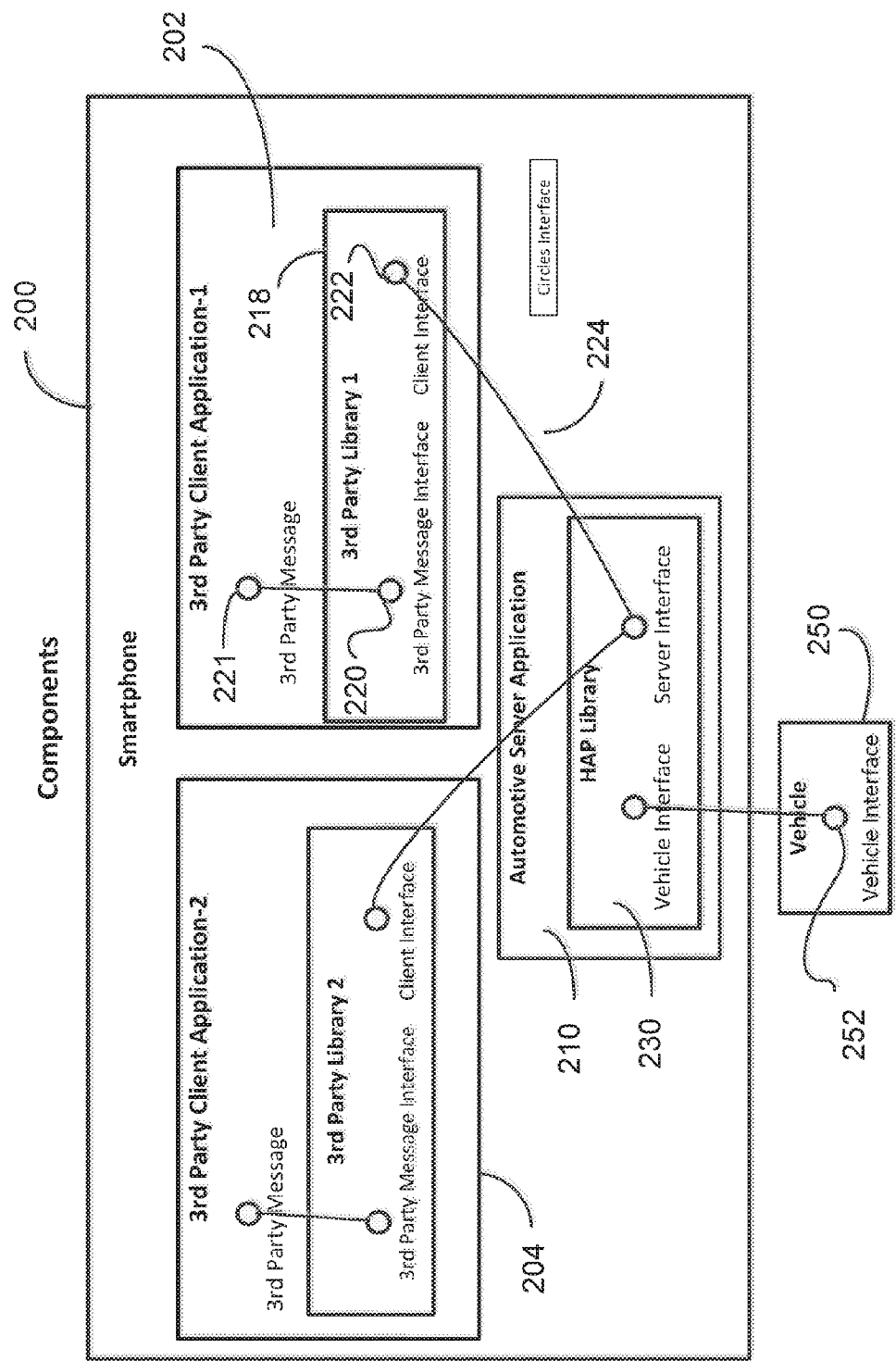
FIG. 2 illustrates a system that implements features of the present disclosure for communications between a vehicle and applications installed on a smartphone coupled to the vehicle.

FIG. 2 illustrates a system that implements features of the present disclosure for communications between a HU (102 in FIG. 1) and applications installed on a smartphone or other mobile device. This system includes smartphone 200. Various applications may be installed on the smartphone, including TPA client application 1 at reference 202 and a second application 2 at reference 204. The smartphone 200 also includes a server application, for example, an automotive server application 210 intended to carry out the functions of a server app outlined above. Application 1 includes a library of software programs or modules, including interfaces. A third-party message interface, shown at circle 220, communicates with a correspond interface 221 of the application 202 to send and receive messages to and from the application. The library 218 includes another interface, shown at circle 222 for interfacing to the server application 210, illustrated as path 224. In operation, a third-party message originated by the application 202 may be transferred using the interface 220 forwarded to the server application 210 utilizing the client interface 222 to communicate with the server application 210.

In more detail, the server application 210 includes a library (HAP Library) 230. Library 230 includes an interface to communicate with the client interface 222 of application 1, as well as other applications on the smartphone 200. To illustrate, path 240 shows communication between the HAP server interface and the client interface of application 2, numbered 204. Protocols implemented by these interfaces are described further below.

In general, the server application library 230 will contain appropriate logic to establish a connection with an EA, such as vehicle 250, as described in more detail below. More specifically, the vehicle 250 typically will include a HU that provides an interface 252. The server app will maintain the connection to the HU, and disconnect when appropriate. At the same time, the server application will handle messaging in both directions (i.e., to and from the vehicle) for various applications such as app 1 (202) and app 2 (204).

In this way, methods and apparatus in accordance with the present disclosure will provide a single automotive application 210 that maintains an EA session with the HU. This server application also acts a network server for any third-party application on the smartphone. Third-party application developers may be provided a software library (for example, elements of library 218) that encapsulates messages from the third-party application and sends them as a client to the automotive application server. Third-party applications can send and receive messages from the automotive application server 210 instead of individually managing an EA session with the HU. The server application encapsulates and unwraps the client messages for the HU (or other user interface) and manages the connection with the HU.

Various protocols may be used for messaging between the client apps and the server app consistent with the present disclosure. In one example, a TPA initiates a connection to the automotive application server, sending a request with its unique application name and parameters. In some examples, the parameters may include one or more of application state information: foreground/background status, bundle-id string, application name, communication scheme, API version. These parameters may evolve as the API is updated. The automotive application server may respond with a confirmation message with server state if the connection will be accepted. Content of the confirmation message may vary according to the current API. After the confirmation, the automotive application server and the third-party client are considered connected and can begin passing control messages.

Figure 3:
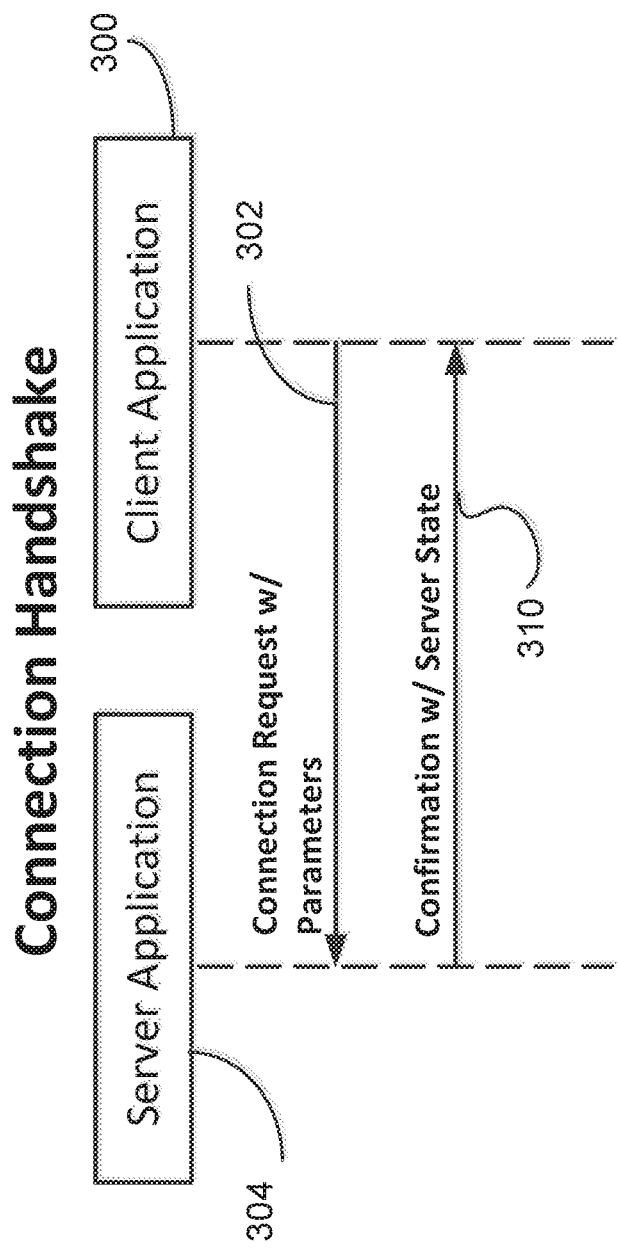
FIG. 3 illustrates an example of connection handshake protocol useful in some systems of the type illustrated in FIG. 1.

In some embodiments, a connection between the third-party application client and the automotive application server begins with a connection handshake. This connection remains valid until the server or the client disconnects. The client can trigger a disconnection through an interface provided by the software library (218 in FIG. 2). A disconnection may also occur when the third-party client application is closed on the phone. FIG. 3 illustrates an example of a connection handshake protocol useful in some systems of the type illustrated in FIG. 1. In FIG. 3, a client app 300 first sends a connection request message 302 including appropriate parameters to the server application 304. As mentioned, the server app responds with a confirmation message 310. The confirmation may include parameters such as whether the server application is currently connected to the HU or not.

In a preferred embodiment, the server maintains a table of connected third-party applications. A disconnected client may be removed from the table. The server will be considered disconnected from the clients and all clients will become disconnected if the automotive server application is shut down on the phone. Third-party clients will send their phone foreground state when it becomes active and the server app will track that status for all connected clients. Typically the last third-party client to send a foreground active state will be considered the only active client.

Figure 4:
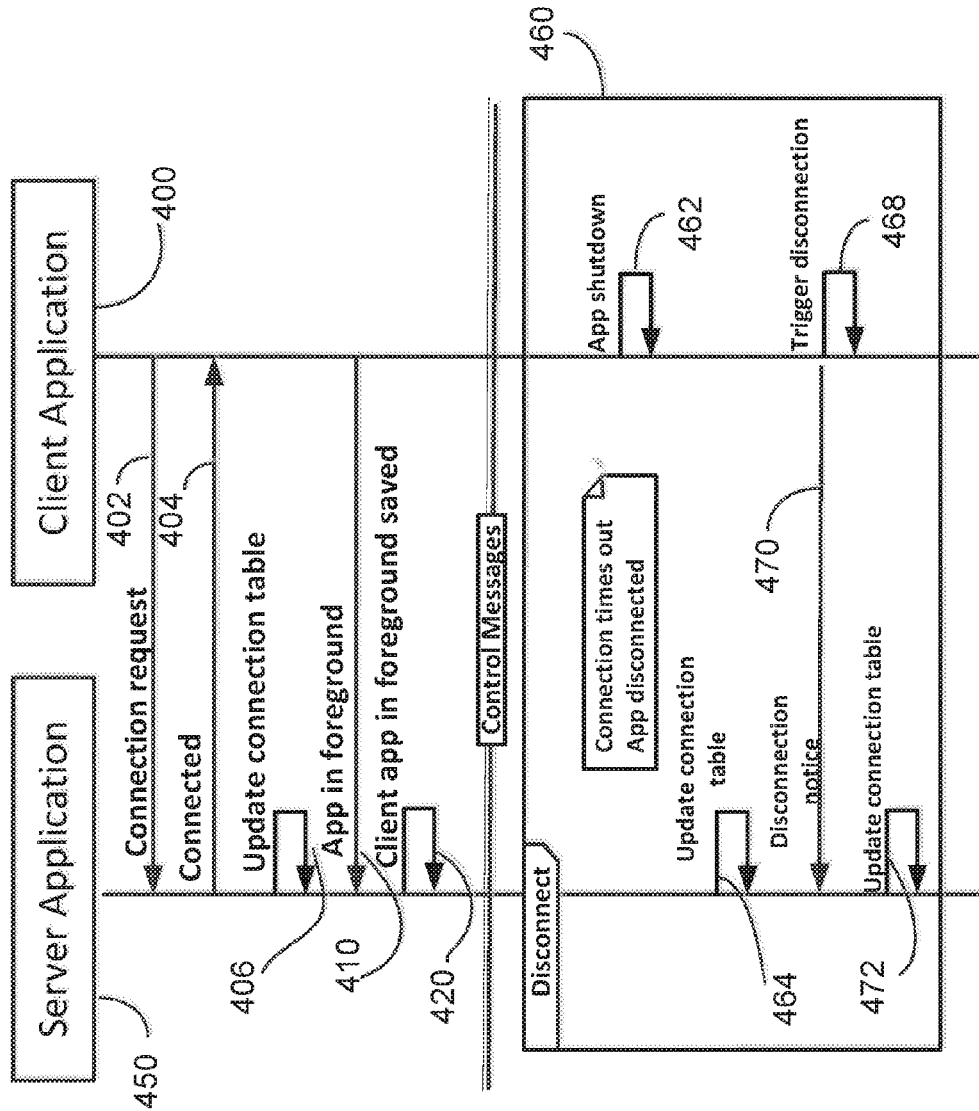
FIG. 4 illustrates a connection state diagram showing connection related messages between a server application and a client application consistent with the present disclosure.

FIG. 4 illustrates a connection state diagram showing connection related messages between a server application and a client application consistent with the present disclosure. In FIG. 4, a client app 400 sends a connection request 402, and receives a connected message 404 back from the server app 450. Internally, the server app 450 updates its connection table at 406. Subsequently, the client app sends a message 410 indicating that the app is in foreground mode. This state change is stored in the server app, step 420. Thereafter, various control messages are passed between the client app 400 and the connected EA by way of the server application 450 connection to the EA.

A disconnect protocol 460 is illustrated in FIG. 4 as well. When the application 400 shuts down, indicated at 462 (or times out), the server app updates its connection table accordingly, step 464. In some cases, the client app may trigger or request disconnection, step 468. It sends a disconnection notice (message) 470 to the server app, which in response updates the connection table, step 472.

In one embodiment, six connection messages are sent asynchronously between the third-party client application and the automotive server application, as follows:

The Server State message from server to client communicates the connection status of the HU or other EA. This typically occurs, as noted, in the initial client connection handshake. This message may be resent whenever the connection state changes on the server. This change preferably is sent to every connected client on the active list or table.

The App State message from client to server communicates the foreground status mentioned above (410 in FIG. 4).

The App Switch message from server to client communicates the user intent to change active application on the phone. In an embodiment, App Switch messages may be produced by activity on the HU. This is interpreted by the server application (it is the only app connected to the HU) and forwarded on to the known active application.

Finally, three control messages are used, a third-party application event, and HU requests and responses.

Figure 5:
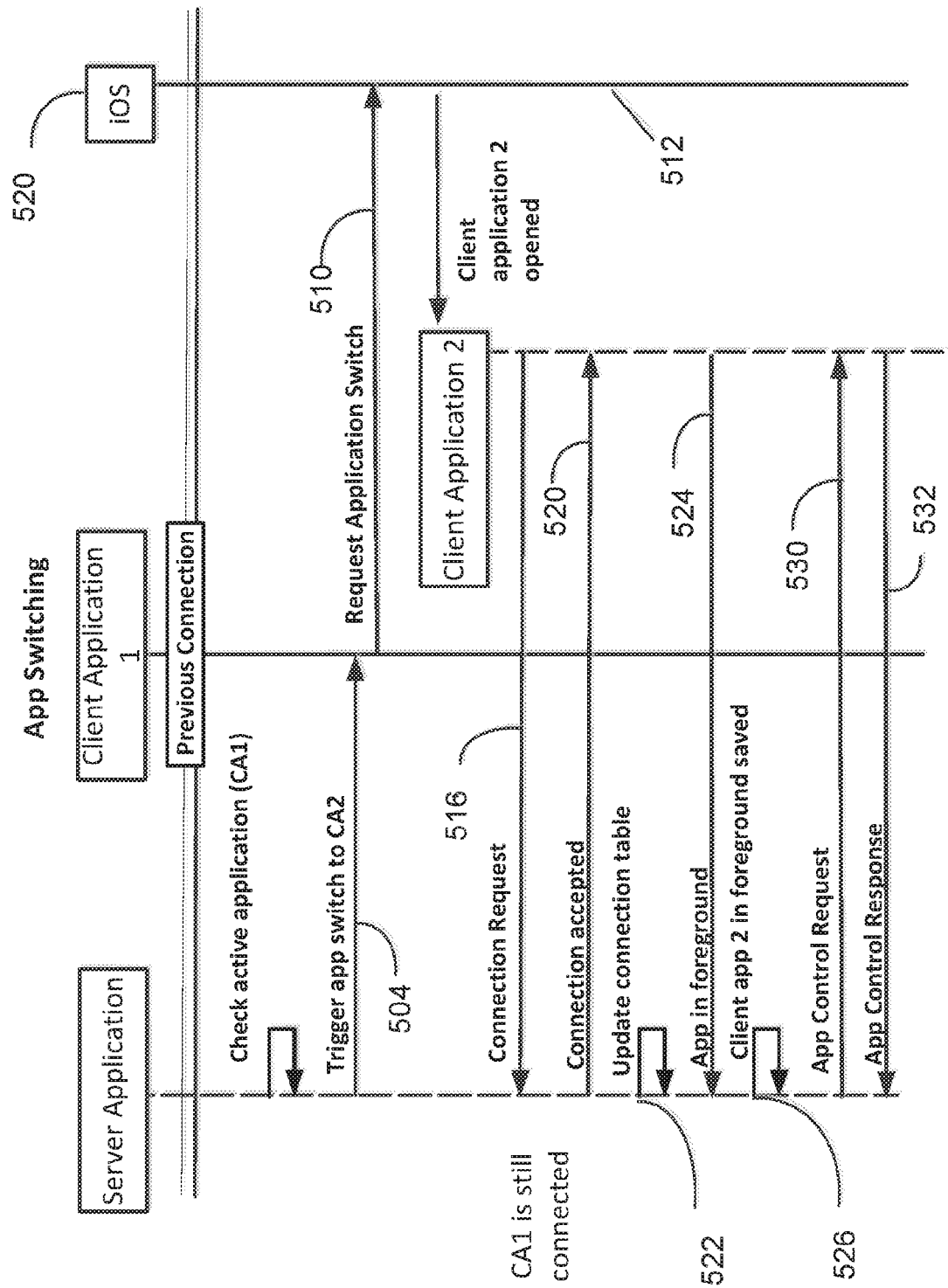
FIG. 5 illustrates an application switching process useful in some systems of the type illustrated in FIG. 1.

FIG. 5 illustrates an example of application switching communications useful in some systems of the type illustrated in FIG. 1. In FIG. 5, we assume initially that client app 1 is connected to the server app. An event on the HU may trigger an app switch. For example:

HU displays a screen with a list of apps on the phone.
User presses on the HU to select an app.
Server app receives this request, interprets it, and determines the phone app to switch to.
Server app is not active (i.e., the foreground app on the phone) so it must send this request to the active app, CA1.

Responsive to the HU input, the server app may send a message 504 to client application 1 to trigger an application switch to client app 2 ("CA2" in the drawing). In response, client app 1 sends an application switch request 510 to the phone operating system, for example, iOS 520. The OS then sends a message to open client app 2, message 512. Client app 2 then sends a connection request 516 to the server app, similar to request 402 in FIG. 4. A connected (accepted) message 520 is returned to CA2, and the server app updates its connection table accordingly, step 522. Client app 1 is still connected to the server app, but it is no longer the active application. Client app 2 sends a foreground state message 524 to the server. That update is saved by the server application, step 526. It may be indicated in the connection table. Next the server may send an app control request 530 to CA2, to which the client responds via app control response message 532.

Control messages may be managed by both the client and server utilizing an appropriate transport layer before being sent over the phone network layer. In one embodiment, these messages are wrapped or encapsulated, for example, by applying header bytes by the transport player that contains a unique identifier representing the client app. The client determines the unique identifier and this identifier is saved by the server until the client is disconnected. The client identifier may be stored in the server connection table or elsewhere. In more detail, for some embodiments, the message wrapping may be performed by the server app library 230 in FIG. 2. To that end, each TPA must provide its own unique identifier to the library; this may be required as part of the library's API.

Figure 6:
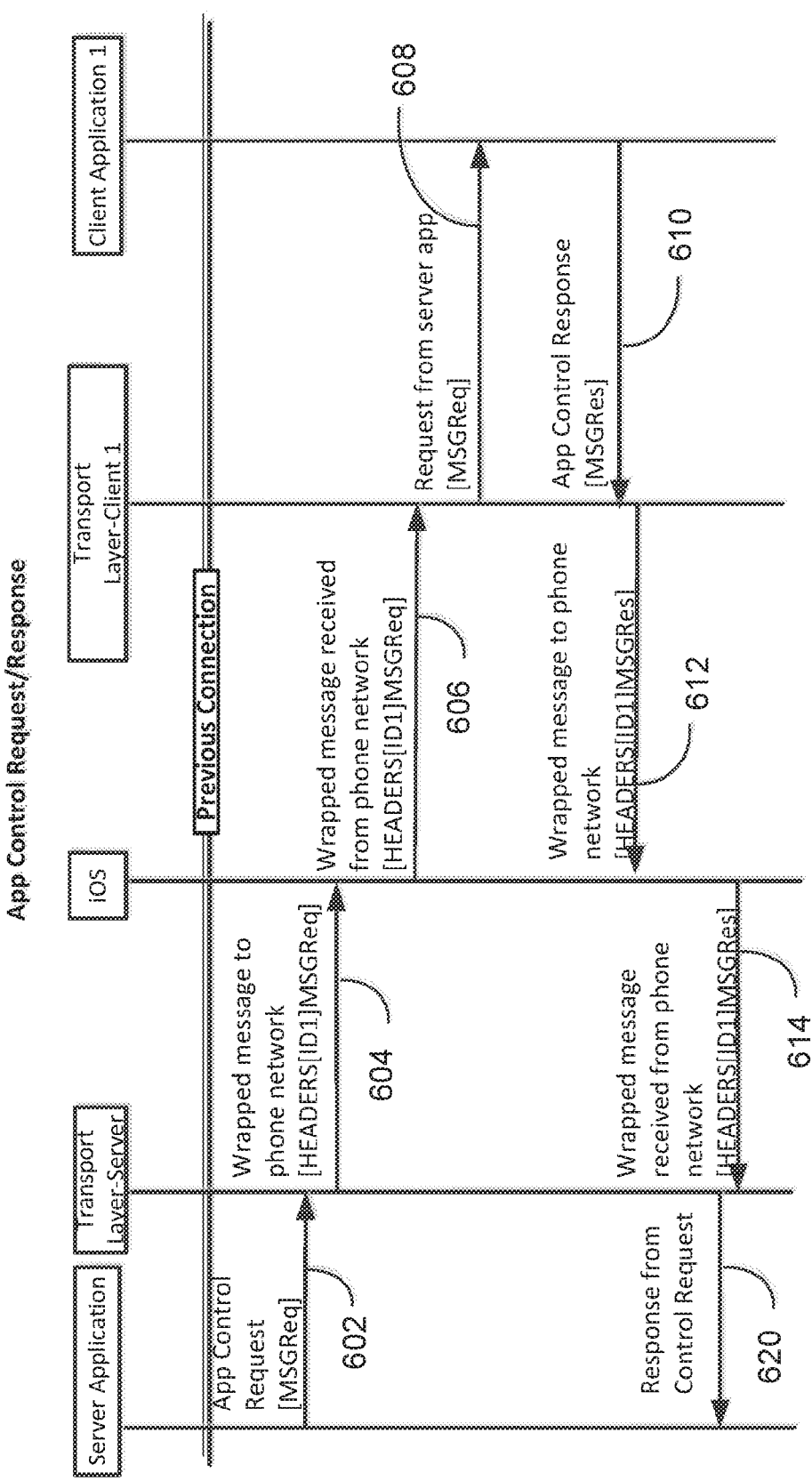
FIG. 6 is a messaging flow diagram illustrating control message management in a smartphone utilizing aspects of the present disclosure.

FIG. 6 is a messaging flow diagram illustrating control message management in a smartphone utilizing aspects of the present disclosure. In this example, we again assume an extant connection between a server app and a client app (CA1). The iOS again is used for illustration and not to imply limitation to any particular operating system on the phone. An application control request is sent by the server application to the transport layer on the server side, request 602. The transport layer encapsulates the message and sends it to the phone OS, message 604. In one example, a message header is added along with an identifier of the client app. The OS in turn passes the message 606 to the transport layer on the client side—CA1. The client side transport layer removes the header and sends on the original control request message (602) to the client app, message 608.

In the reverse direction, as illustrated in FIG. 6, the client app generates a control response message 610, that message is encapsulated by the transport layer and sent on to the OS as message 612, passed on to the server app, message 614, and again unwrapped by the transport layer and delivered to the server app as response message 620. Details of the transport layer are not critical and other variations may be used. Other variations, for example, to identify the client applications should be considered equivalents.

Most of the equipment discussed above comprises hardware and associated software. For example, the typical electronic device is likely to include one or more processors and software executable on those processors to carry out the operations described. We use the term software herein in its commonly understood sense to refer to programs or routines (subroutines, objects, plug-ins, etc.), as well as data, usable by a machine or processor. As is well known, computer programs generally comprise instructions that are stored in machine-readable or computer-readable storage media. Some embodiments of the present invention may include executable programs or instructions that are stored in machine-readable or computer-readable storage media, such as a digital memory. We do not imply that a "computer" in the conventional sense is required in any particular embodiment. For example, various processors, embedded or otherwise, may be used in equipment such as the components described herein.

Memory for storing software again is well known. In some embodiments, memory associated with a given processor may be stored in the same physical device as the processor ("on-board" memory); for example, RAM or FLASH memory disposed within an integrated circuit microprocessor or the like. In other examples, the memory comprises an independent device, such as an external disk drive, storage array, or portable FLASH key fob. In such cases, the memory becomes "associated" with the digital processor when the two are operatively coupled together, or in communication with each other, for example by an I/O port, network connection, etc. such that the processor can read a file stored on the memory. Associated memory may be "read only" by design (ROM) or by virtue of permission settings, or not. Other examples include but are not limited to WORM, EPROM, EEPROM, FLASH, etc. Those technologies often are implemented in solid state semiconductor devices. Other memories may comprise moving parts, such as a conventional rotating disk drive. All such memories are "machine readable" or "computer-readable" and may be used to store executable instructions for implementing the functions described herein.

A "software product" refers to a memory device in which a series of executable instructions are stored in a machine-readable form so that a suitable machine or processor, with appropriate access to the software product, can execute the instructions to carry out a process implemented by the instructions. Software products are sometimes used to distribute software. Any type of machine-readable memory, including without limitation those summarized above, may be used to make a software product. That said, it is also known that software can be distributed via electronic transmission ("download"), in which case there typically will be a corresponding software product at the transmitting end of the transmission, or the receiving end, or both.

Having described and illustrated the principles of the invention in a preferred embodiment thereof, it should be apparent that the invention may be modified in arrangement and detail without departing from such principles. We claim all modifications and variations coming within the spirit and scope of the following claims.

The invention claimed is:

1. A mobile device, comprising:
a server application component to couple the mobile device to a motor vehicle via a wired connection or a short range wireless connection;
a plurality of client application components, each client application component including a client interface for communications with the server application component;
wherein the server application component includes a server interface for communications with the client application components and is configured to manage a session with a remote component of the motor vehicle, and to process bidirectional control messaging between an active one at a time of the plurality of client application components and the remote component of the motor vehicle over a connection of said session, the server interface is configured to encapsulate original control messages originating from the motor vehicle by applying headers to the original control messages, the headers to be removed by the client interfaces, each header to include a selected one of a plurality of unique identifiers that correspond to the plurality of client application components, respectively;
wherein the client interfaces are configured to identify received encapsulated messages based on the unique identifiers, unwrap the received encapsulated messages, and transmit the original control messages to the client application components.

2. The mobile device of claim 1, wherein:
each client application component is configured to initiate a connection to the server application component over the corresponding client interface; and
the server application component is configured to transmit a confirmation message over the server interface in response to receiving a connection request from one of the client application components to establish the connection with the requesting client application component.

3. The mobile device of claim 2, wherein the client application component is configured to transmit an application switch request to the server application component in response to a predetermined event.

4. The mobile device of claim 3, wherein the predetermined event corresponds to a user of the mobile device interacting with an operating system of the mobile device to change application foreground status by opening a selected one of the client applications.

5. The mobile device of claim 2, wherein the server application component is further configured maintain a connection table that identifies the client application components with which a connection is established, wherein connection table stores at least one of the unique identifiers or other information to identify the client application components.

6. The mobile device of claim 5, wherein the server application component is configured to update the connection table in response to termination of the connection with the requesting client application component.

7. The mobile device of claim 6, wherein the server application component is configured to maintain the connection of the session so long as said connection table indicates that the server application is connected to the requesting client application component.

8. A computed-implemented method comprising:
providing a server application in a mobile phone, the server application configured to manage a session with a head unit of a motor vehicle;

in the server application, receiving a connection request generated by the mobile phone, the connection request initiated by a client application of the mobile phone, and the connection request including a unique client application name and at least one parameter;

if a connection already exists between the mobile phone and a head unit of the motor vehicle for a different application identified in a connection table, updating the connection table for the client and/or the application to associate said client for said application with the existing connection;

otherwise, establishing a new connection responsive to the connection request;

transmitting back to the client a server state message including server state;

wherein the server application includes a server interface configured to encapsulate original control messages originating from the motor vehicle by applying headers to the original control messages based on information from the connection table, each header to be removed by a respective one of client interfaces of the client applications;

wherein the client interfaces are configured to identify received encapsulated messages based on the headers, unwrap the received encapsulated messages, and transmit the original control messages to the client applications.

9. The computer-implemented method of claim 8, further comprising:

receiving an application state message communicating a change to a foreground status associated with an operating system of the mobile phone; and retaining information in a memory based on the change to the foreground status.

10. The computer-implemented method of claim 9, wherein retaining the information in the memory based on the change to the foreground status includes updating the connection table based on the change to the foreground status.

11. A non-volatile, machine-readable memory apparatus storing instructions for execution in a processor of a mobile device, the instructions arranged to cause the processor to:

establish a communication session with a head unit component of a motor vehicle over a wired or short-range wireless physical connection between the mobile device and the head unit;

establish a connection with a client application component installed on the mobile device;

record the connection with the client application component in a connection table;

receive an encapsulated message from the client application component, remove a wrapper from the received encapsulated messages to recover an original control request message, and transmit the original control request message to the head unit in the communication session; and receive a control response message from the head unit, encapsulate the control response message based on information from the connection table, and transmit the encapsulated message to the client application component in the communication session.

12. The apparatus of claim 11, wherein the connection comprises a first connection and the client application component comprises a first client application component, and wherein the instructions are further arranged to cause the processor to:

establish a second connection with a second client application component installed on the mobile device;

update the connection table to include the second connection; and continue processing control messages to and from the first client application until the first client application is shut down or the first connection times out.

13. The apparatus of claim 12, wherein the instructions are further arranged to cause the processor to:

receive a message indicating that the second client application has changed to foreground state;

responsive to the change to the foreground state, begin processing control messages to and from the second client application, without interrupting the communication session with the head unit.

14. The apparatus of claim 13, wherein the instructions are further arranged to cause the processor to:

receive a control request message from the second client application component;

remove, from the control request message from the second client application component, header information representing a unique identifier provided by the second client application; and store the unique identifier provided by the client application in memory until the second client application is disconnected.

15. The apparatus of claim 14, wherein the instructions implement storing the unique identifier provided by the second client application in the connection table.

* * * * *